United States Patent [19]
Okita

[11] Patent Number: 4,871,049
[45] Date of Patent: Oct. 3, 1989

[54] COUPLING DEVICE OF MAGNETIC PARTICLE TYPE

[75] Inventor: Ryosuke Okita, Hyogo, Japan

[73] Assignee: Mitsubishi Denki Kabushiki Kaisha, Tokyo, Japan

[21] Appl. No.: 181,290

[22] PCT Filed: Jun. 25, 1987

[86] PCT No.: PCT/JP87/00422

§ 371 Date: Apr. 29, 1988

§ 102(e) Date: Apr. 29, 1988

[87] PCT Pub. No.: WO88/00298

PCT Pub. Date: Jan. 14, 1988

[30] Foreign Application Priority Data

Jun. 30, 1986 [JP] Japan ................................. 61-153354

[51] Int. Cl.⁴ ..................... F16D 37/02; F16D 13/72
[52] U.S. Cl. ................................ 192/21.5; 192/113 R; 192/113 B
[58] Field of Search .............. 192/21.5, 113 B, 113 R; 188/264 CC

[56] References Cited

U.S. PATENT DOCUMENTS

| 3,481,439 | 12/1969 | Finkin | 192/113 B |
| 3,592,298 | 7/1971 | Leffert | 188/264 CC |
| 4,611,697 | 9/1986 | Okita et al. | 192/21.5 |

FOREIGN PATENT DOCUMENTS

| 1545445 | 9/1968 | France. | |
| 51-7789 | 3/1976 | Japan. | |
| 52-36247 | 3/1977 | Japan | 192/113 B |
| 54-169648 | 11/1979 | Japan. | |
| 57-127130 | 8/1982 | Japan | 192/113 B |
| 60-510 | 1/1985 | Japan. | |
| 60-8184 | 3/1985 | Japan. | |
| 2063413 | 6/1981 | United Kingdom. | |

OTHER PUBLICATIONS

"Selectroshift and Autoselectric Transmissions" in *Automobile Engineer*, Sep. 1957, pp. 2–10.

Primary Examiner—Leslie A. Braun
Assistant Examiner—David A. Testardi
Attorney, Agent, or Firm—Sughrue, Mion, Zinn, Macpeak, and Seas

[57] ABSTRACT

A magnetic-particle-type coupling device for transmitting the rotation of an engine to a transmission. One end portion of a heat pipe is embedded in a driven body, the other end portion of the heat pipe is inserted in the internal opening of the input shaft of the transmission, and cooling oil is supplied into the internal opening, so that the driven body and a driving body are efficiently cooled although the coupling device is made compact.

3 Claims, 2 Drawing Sheets

COUPLING DEVICE OF MAGNETIC PARTICLE TYPE

TECHNICAL FIELD

The present invention relates to a magnetic-particle-type coupling device for transmitting the rotation of the crankshaft of an engine to a transmission, and particularly relates to the improvement of a means for cooling the driven body of the coupling device.

BACKGROUND ART

FIG. 1 shows a conventional magnetic-particle-type coupling device disclosed in the Japanese Patent Application (OPI) No. 60733/81 (the term "OPI" as used herein means an "unexamined published application"). Rotation whose speed is changed by a transmission 2 to which the coupling device 1 is connected is decelerated by the differential gear unit of a speed reducer 3 and then transmitted to axles. The magnetic-particle-type coupling device 1 comprises a driving body 4 constructed by conjoining two members to each other in the axial direction of the coupling device and secured to a driving plate 6 secured to a crankshaft 5; an excitation coil 7 housed in the opening of the driving body 4; a driven body 8 whose outside circumferential surface faces the inside circumferential surface of the driving body 4 across a gap and which is secured to a hub 11 supported by a bearing 10 to a bracket 9 attached to the driving body; magnetic particles 12 filled in the gap; a pair of slip rings 13 which are secured with an electric insulation bushing 15 to a cap 14 attached to the bracket 9 and are connected so as to supply electricity to the excitation coil 7; a brush unit 16 for supplying the electricity through the slip rings 13; and a coupling shaft 17 secured to the hub 11 and constituting the input shaft 17a of the transmission 2. A case 18 houses the coupling device 1 and the transmission 2. A temperature sensor 19 is secured to the portion of the case 18, which faces the coupling device 1. Shown at 20 and 21 in FIG. 1 are a ring gear and the output shaft of the transmission 2, respectively.

When the electricity is supplied to the excitation coil 7 as the driving body 4 is rotated by the crankshaft 5 after the starting of an engine, the magnetic particles 12 are magnetized to couple the driving body and the driven body 8 to each other to transmit the rotation of the driving body to the driven body to rotate the input shaft 17a of the transmission 2 through the coupling shaft 17. Between the input shaft 17a and output shaft 21 of the transmission 2, the speed of the rotation is changed among a low, a second, a third and a fourth speed stages by a plurality of speed change gear means between the input and the output shafts in response to the manipulation of a manual speed change lever. The rotation of the output shaft 21 is transmitted to wheels through the differential gear unit of the speed reducer 3 and the axles.

Since it is necessary to smoothly increase the coupling torque of the magnetic-particle-type coupling device 1 at the time of starting of a vehicle, a slip takes place between coupling members to generate heat to raise the temperature of the coupling device. If the rise in the temperature of the coupling device is large, the device burns. This is a problem.

To prevent the problem, the temperature sensor 19 is attached to the case 18 to supply a signal from the temperature sensor to a controller through a second speed stage switch which is turned on when the vehicle is started at the second speed stage of the transmission 2. When the second speed stage switch is turned on and the temperature in the case 18 has exceeded a limit due to the frequent repetition of the starting of the vehicle at the second speed stage of the transmission 2, the signal from the temperature sensor 19 is supplied to the controller to alter the electrical current of a clutch to shift the torque of the clutch to a level for a lower speed stage. As a result, the starting of the vehicle at the second speed stage of the transmission 2 is made impossible to suppress the rise in the temperature in the case 18 to prevent the coupling device 1 from burning.

However, since the temperature of the internal opening of the case 18 is detected by the temperature sensor 19, it is difficult to accurately detect the temperature of the driving body 4 or the driven body 8. Particularly when the temperature of the driving body 4 or the driven body 8 has exceeded a limit in a short time, the detection of the rise in the temperature by the temperature sensor 8 delays so that the coupling device 1 burns. This is another problem. Although it is possible to attach cooling fins or the like to the driving body 4 in an outer position to cool the driving body, it is difficult to cool the driven body 8 in an inner position. This is still another problem.

A conventional cooler for a magnetic-particle-type coupling device was disclosed in the Japanese Utility Model Application No. 510/85. In the cooler circumferential surface of a stator in an internal position is secured to the hermetically sealed tube of a heat exchanger, cooling fins are provided on the outer end portion of the tube and project into the external air, a wick is provided in the tube, and a working liquid is hermetically enclosed in the tube. Although the stator in the internal position can be cooled by the external air through the heat exchanger of the cooler, the efficiency of heat transfer by a means for transferring the heat of the stator to the external air through the cooling fins of the heat exchanger is low and the cooling fins need a large heat transfer area which means that the installation space for the cooler is large. These are still other problems.

The present invention was made in order to solve the above-mentioned problems.

Accordingly, it is an object of the present invention to provide a magnetic-particle-type compact coupling device in which a driven body is directly cooled through efficient transfer of heat to enable the coupling device to withstand severe operation.

DISCLOSURE OF THE INVENTION

In the magnetic-particle-type coupling device provided in accordance with the present invention, the heat-incoming portion of a heat pipe is embedded in the driven body and the heat-outgoing portion of the heat pipe is inserted in the hole of the input shaft of a transmission so as to be cooled by cooling oil supplied into the hole.

Since the heat-outgoing portion of the heat pipe is efficiently cooled by the cooling oil of high thermal conductivity, the driven body is directly cooled so that the driving body of the coupling device is indirectly cooled. As a result, the temperature of the coupling device is prevented from excessively rising. Besides, the size of the coupling device is not increased.

BRIEF DESCRIPTION DRAWINGS

BEST MODE FOR CARRYING OUT THE INVENTION

Figure 1:
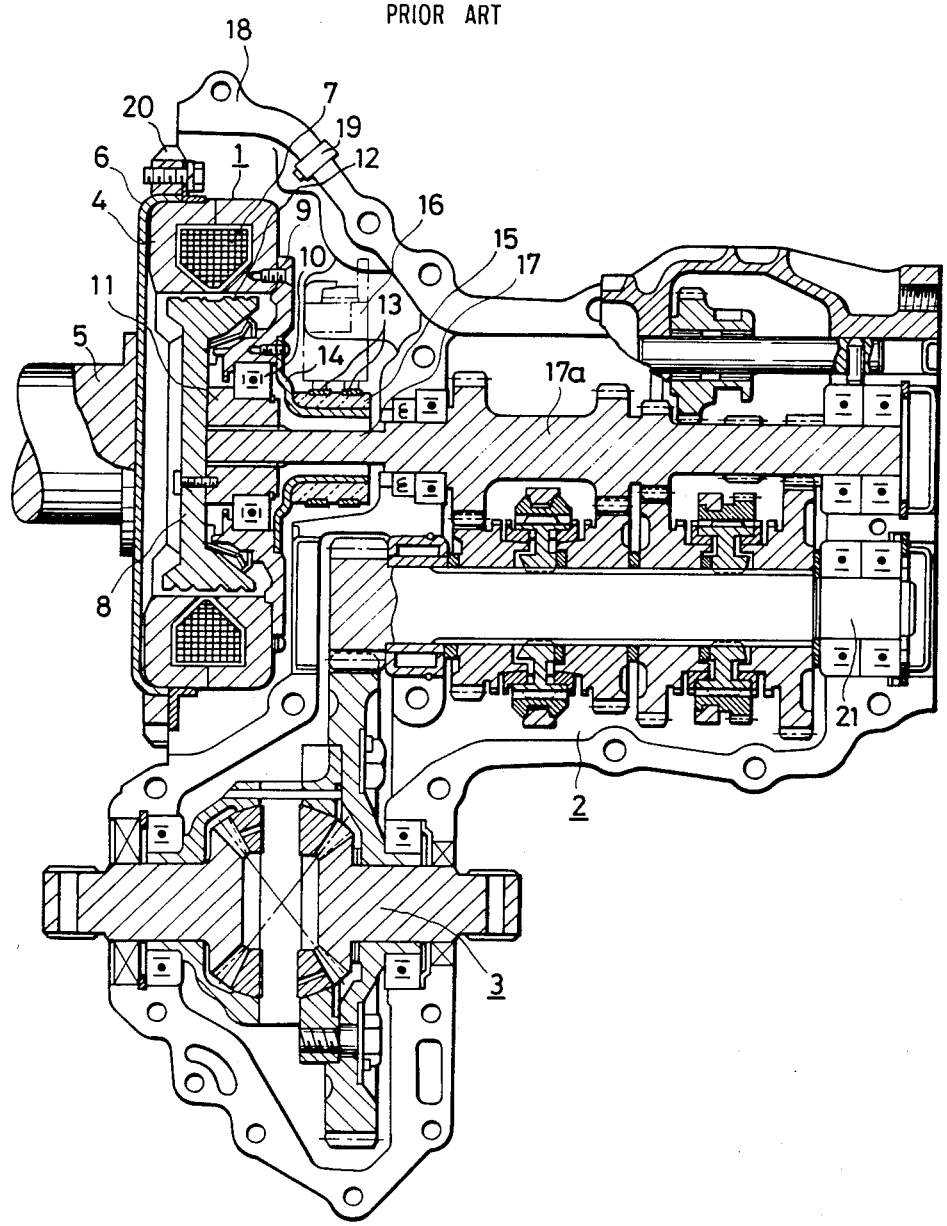
FIG. 1 shows a sectional view of a conventional magnetic-particle-type coupling device.
Figure 2:
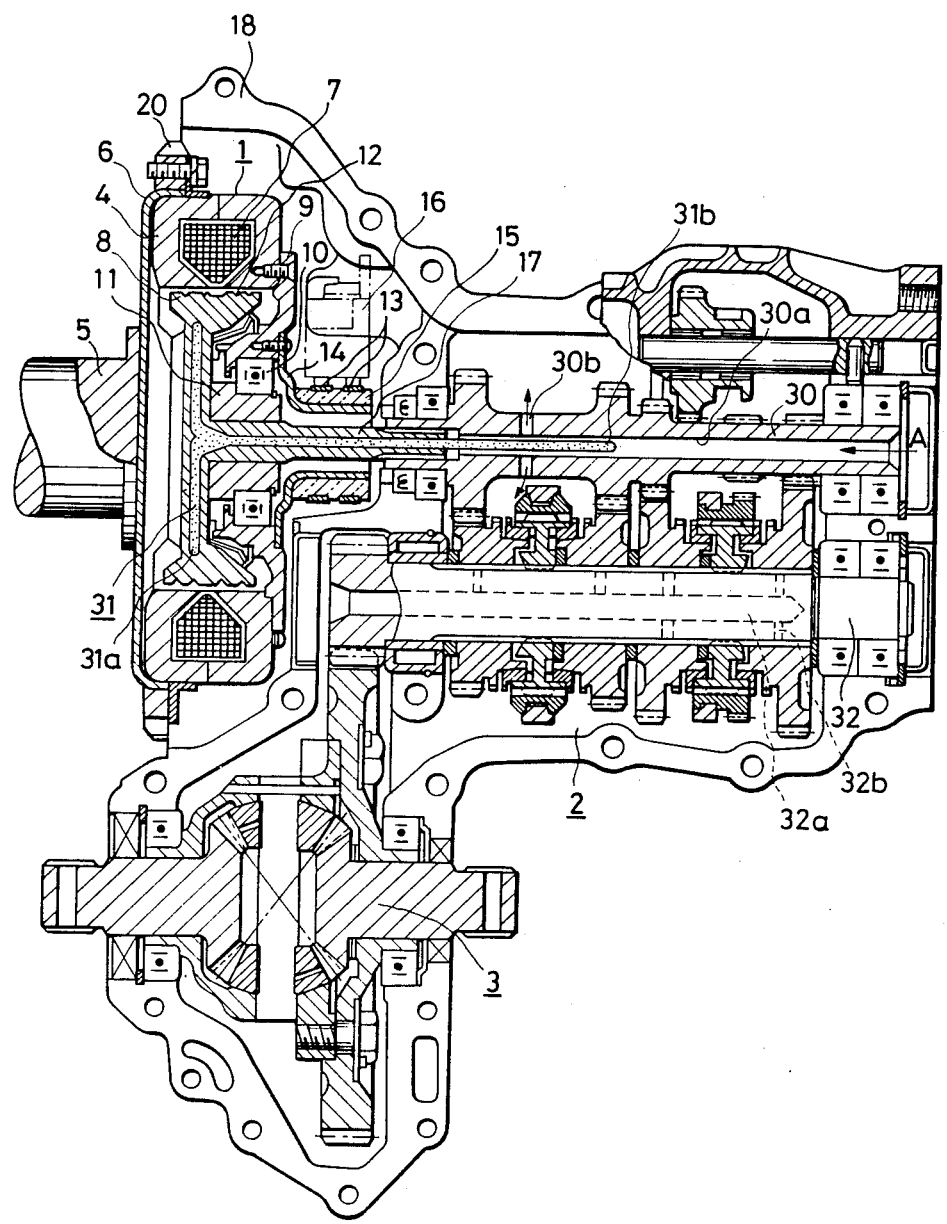
FIG. 2 shows a sectional view of a magnetic-particle-type coupling device which is an embodiment of the present invention.

The present invention is hereafter described with reference to the drawings so as to be understood in detail. FIG. 2 shows a magnetic-particle-type coupling device which is an embodiment of the present invention and connected to a transmission. The mutually corresponding portions shown in FIGS. 1 and 2 are denoted by the same reference symbols therein.

As shown in FIG. 2, the input shaft 30 of the transmission 2 is spline-connected to the splined portion 17b of a coupling shaft 17 and has an internal opening 30a extending along the axis of the input shaft and has a through hole 30b through which the internal opening communicates with an opening around the outside circumferential surface of the input shaft near the coupling shaft. A working liquid, which is repeatedly evaporated and liquefied, and a wick for moving the working liquid are hermetically enclosed in a heat pipe 31 whose heat-incoming end portion 31a is radially ramified in the radial direction of the coupling device 1 and embedded in a driven body 8 and whose heat-outgoing end portion 31b extends in the coupling shaft 17 along the axis thereof and projects into the internal opening 30a of the input shaft 30. The output shaft 32 of the transmission 2 has an internal opening 32a extending along the axis of the output shaft, and a plurality of through holes 32b through which the internal opening communicates with an opening around the outside circumferential surface of the output shaft. The internal openings 30a and 32a and the through holes 30b and 32b constitute passages through which cooling oil is circulated.

When an excitation coil 7 is supplied with electricity after the starting of an engine, magnetic particles 12 are magnetized so that a driving body 4 and the driven body 8 are coupled to each other. Although heat is generated due to a slip between the driving body 4 and the driven body 8 so that the temperature of the driving and the driven bodies rises, some of the heat is transferred from the peripheral surfaces of the driving and the driven bodies and the other of the heat is conducted to the heat-incoming end portion 31a of the heat pipe 31 so that the working liquid supplied into the heat-incoming end portion through the wick is sequentially evaporated by the conducted heat. In the meantime, the cooling oil is supplied into the internal opening 30a of the input shaft 30 in a direction A from outside by an oil pump (which is not shown in the drawing) to cool the heat-outgoing end portion 31b of the heat pipe 31 to liquefy the vapor of the working liquid. For that reason, the heat of the driven body 8 is taken out by the cooling oil. The driving body 4 is also cooled as the temperature of the driven body 8 is lowered.

After the cooling oil supplied into the internal opening 30a of the input shaft 30 cools the heat pipe 31, the cooling oil flows through the through hole 30b and lubricates the gears of the transmission 2 and is thereafter returned to an oil tank (which is not shown in the drawing) through the through holes 32b and internal opening 32a of the output shaft 32. As a result, the transfer of the heat from the heat pipe 31 is efficiently performed by the cooling oil. Since it is not necessary to provide cooling fins or the like to perform the transfer of the heat, the coupling device 1 can be made compact.

Although the excitation coil 7 is housed in the driving body 4 in the above-described embodiment, the present invention is not confined thereto but may be otherwise embodied so that the driven body 8 is made of two portions split from each other in the axial direction of the driven body and the excitation coil is housed therein.

According to the present invention, the heat-incoming portion of the heat pipe is embedded in the driven body and the heat-outgoing portion of the heat pipe is inserted in the oil hole of the input shaft of the transmission so as to be cooled by the cooling oil, as described above, as a result, the generated heat is efficiently removed to suppress the rise in the temperature of the driving and the driven bodies to enable the magnetic-particle-type coupling device to withstand severe operation. Besides, the coupling device is compact.

I claim:

1. A magnetic-particle-type coupling device for transmitting the rotation of a crankshaft of an engine to an input shaft of a transmission, said input shaft having an axial internal opening, said coupling device comprising:
    an annularly-shaped driving body having an inside circumferential surface;
    a driven body whose outside circumferential surface faces the inside circumferential surface of said driving body with a gap therebetween, said driven body being coupled to said input shaft;
    magnetic particles disposed in said gap;
    an excitation coil circumscribing said driven body for magnetizing said particles to control the state of connection of said driving and driven bodies; and
    an elongate heat pipe having one end thereof embedded in said driven body and another end of said pipe inserted in the internal opening of said input shaft, wherein cooling oil is supplied into said internal opening to cool said other end of said pipe, and wherein said one end of the heat pipe is radically ramified in the radial direction of the driven body.

2. A magnetic-particle-type coupling device according to claim 1, wherein a coupling shaft is provided in the driven body along the axis thereof; the input shaft of the transmission is spline-coupled to said coupling shaft; and the heat pipe is inserted into the internal opening of said input shaft through said coupling shaft along the axis thereof.

3. A magnetic-particle-type coupling device for transmitting the rotation of a crankshaft of an engine to an input shaft of a transmission, said input shaft having an axial internal opening, said coupling device comprising:
    an annularly-shaped driving body having an inside circumferential surface;
    a driven body whose outside circumferential surface faces the inside circumferential surface of said driving body with a gap therebetween, said driven body being coupled to said input shaft;
    magnetic particles disposed in said gap;
    an excitation coil circumscribing said driven body for magnetizing said particles to control the state of connection of said driving and driven bodies; and
    an elongate heat pipe having one end thereof embedded in said driven body and another end of said pipe inserted in the internal opening of said input shaft, wherein cooling oil is supplied into said internal opening to cool said other end of said pipe, and wherein said input shaft of the transmission has the internal opening extending along the axis of said input shaft, and a through hole through which said internal opening communicates with an opening around an outside circumferential surface of said input shaft the cooling oil being drained through said through hole.

* * * * *